United States Patent [19]

Krause

[11] Patent Number: 4,940,506

[45] Date of Patent: Jul. 10, 1990

[54] DEVICE FOR USE WITH SELF-ADHESIVE REMOVABLE LABELS

[75] Inventor: Ronald O. Krause, Appleton, Wis.

[73] Assignee: MEI Services, Inc., Menasha, Wis.

[21] Appl. No.: 310,237

[22] Filed: Feb. 13, 1989

[51] Int. Cl.[5] ............................................ B32B 31/16

[52] U.S. Cl. .................................... 156/584; 156/344; 271/42

[58] Field of Search .................... 156/344, 584; 271/42

[56] References Cited

U.S. PATENT DOCUMENTS 3,871,641 3/1975 Marx et al. ............................ 271/42

3,966,190 6/1976 Grant .................................. 271/42

*Primary Examiner*—Robert A. Dawson

*Attorney, Agent, or Firm*—Andrus, Sceales, Starke & Sawall

[57] ABSTRACT

A device for separating a self-adhesive removable label from its associated support paper includes a first member that has a label gripping surface and a second member that has a support paper gripping surface. The label gripping surface is slidable relative to the support paper gripping surface so that when the gripping surfaces are in engagement with the label and the support paper, the label may be moved relative to the support paper and the process of removing the label from the support paper may be initiated.

11 Claims, 1 Drawing Sheet

FIG. 1
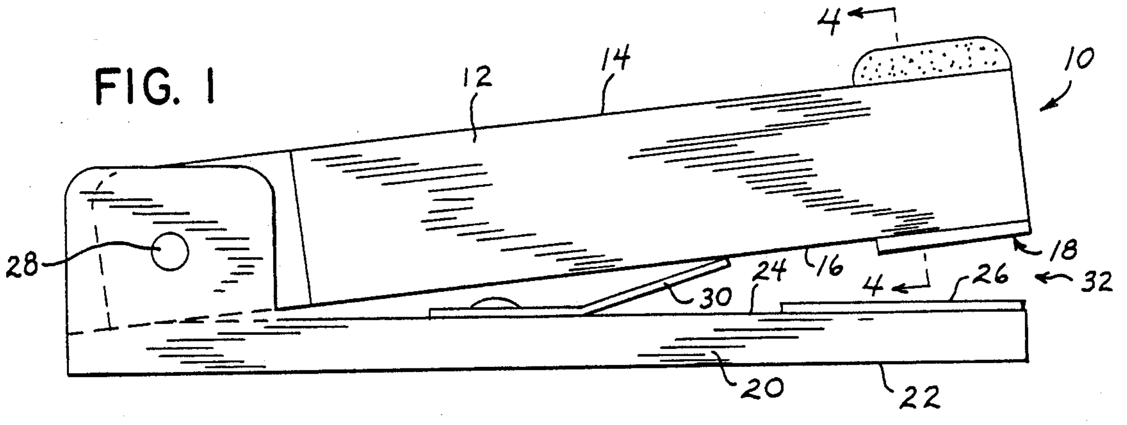
FIG. 2
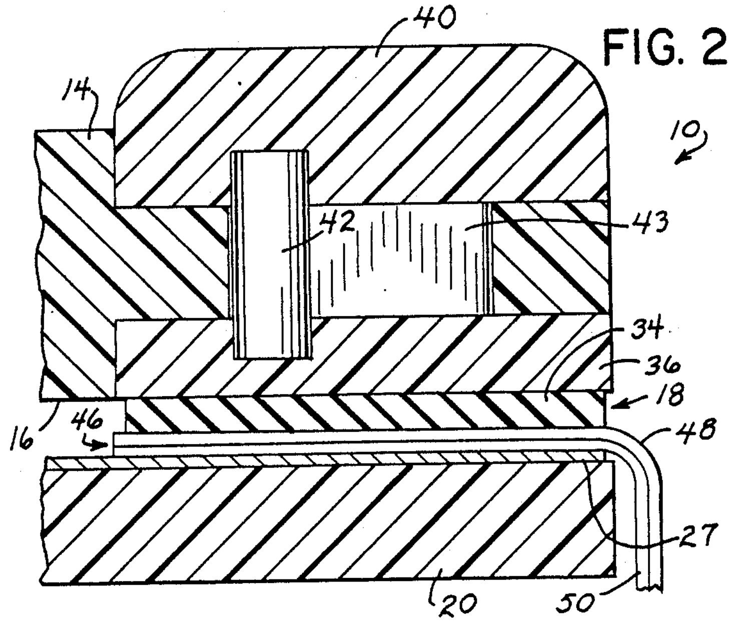
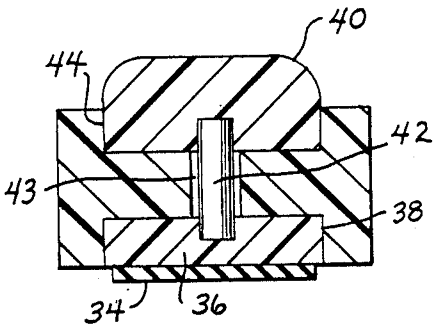
FIG. 4
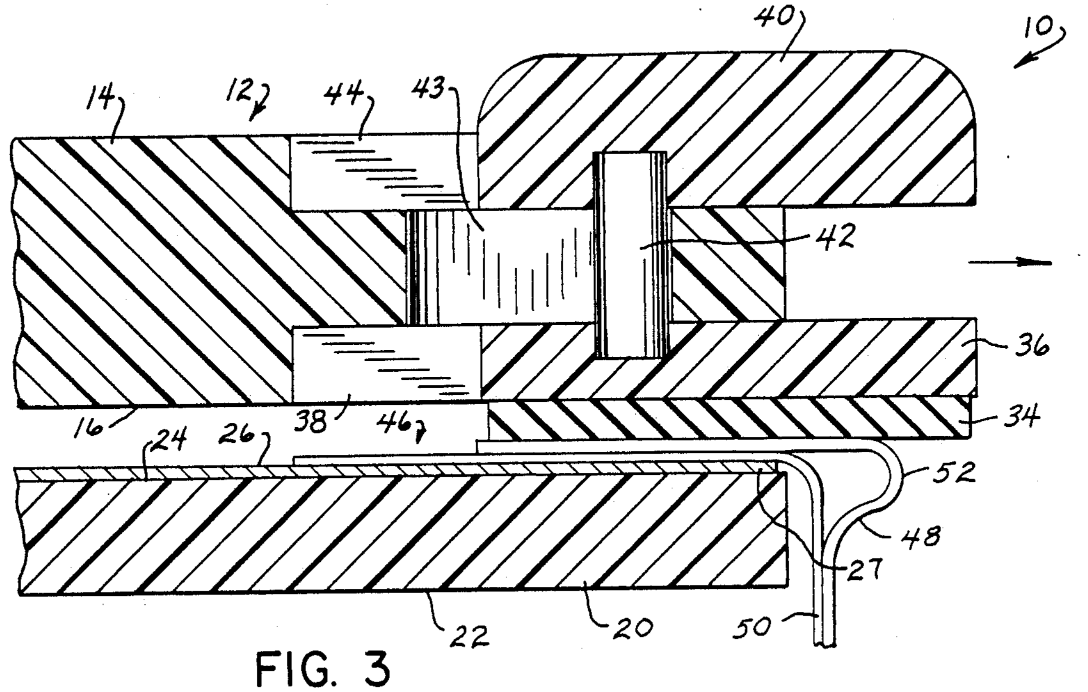
FIG. 3

DEVICE FOR USE WITH SELF-ADHESIVE REMOVABLE LABELS

BACKGROUND OF THE INVENTION

The present invention relates to a device for use with self-adhesive removable labels and more particularly to a device that initiates the process of removing the label from the support paper.

Self-adhesive removable labels of the type in which a label is removed from a support paper and then applied to a package or envelope are in common use in both offices and shipping and receiving facilities. Typically, these labels are removed from their support paper by prying a corner of the label away from the support paper or by applying a rubbing motion with the thumb and forefinger in order to separate the backing from the label. While the labels themselves are convenient in that they require no moistening or application of adhesive, the process of removing the label from the support paper is less than satisfactory in that it is often difficult to pry the label from a corner of the support paper or to rub the support paper away from the label.

The present invention provides a device that easily separates a corner of the label from its associated support paper so that the label may be easily peeled away from the support paper.

SUMMARY OF THE INVENTION

A device for use with self-adhesive removable labels includes a first member that has a label gripping surface.

In accordance with another aspect of the invention, a second member is provided having a support paper gripping surface.

In accordance with yet another aspect of the invention, the device includes operating means for moving the label gripping surface relative to the support paper gripping surface along a line substantially parallel to the gripping surfaces while the gripping surfaces are in engagement with the label and the support paper so that the label is moved relative to the support paper and the process of removing the label from the support paper is initiated.

In accordance with still another aspect of the invention, the label gripping surfaces and the support paper gripping surface are mounted on first and second elongated members that are pivotally attached at one end.

In accordance with still another aspect of the invention, a biasing means is provided to urge the elongated members to an open position in which the first and second elongated members are pivoted away from each other so as to create an opening between the two members.

The present invention thus provides a simple mechanical device that initiates the process of removing a self-adhesive label from its associated support paper.

BRIEF DESCRIPTION OF THE DRAWINGS

The drawings illustrate the best mode presently contemplated of carrying out the invention.

In the drawings:

FIG. 1 is a side view of a device constructed according to the invention;

FIG. 2 is a side cross sectional view of the forward end of the device shown at FIG. 1;

FIG. 3 is a side cross sectional view similar to that of FIG. 2 with the device removing a corner of a self-adhesive label; and FIG. 4 is a sectional view along the line 4—4 of FIG. 1.

DETAILED DESCRIPTION OF THE PREFERRED EMBODIMENT

FIG. 1 illustrates a device 10 for use in removing a self-adhesive label from its associated support paper.

Device 10 includes a first elongated member 12 having an upper surface 14 and a lower surface 16 on which a label gripping surface 18 is slidably disposed at its forward end.

Device 10 also includes an elongated base plate 20 having a substantially planer bottom surface 22 and an upper surface 24 on which is mounted support paper gripping surface 26 which consists of an emery surface 27.

Elongated members 12 and 20 are pivotally connected at their rear end by pin 28 and a leaf spring 30 mounted to upper surface 24 urges elongated member 12 away from base member 20 so that an opening 32 is created at the forward end of the device.

Label gripping surface 18 is slightly thicker than support paper gripping surface 26 so that elongated member 12 is angled slightly downwardly when gripping surfaces 18 and 20 are brought into engagement with a label assembly. This slight angle facilitates the operation of the device.

Label gripping surface 18 consists of a neoprene rubber pad 34 mounted on a plastic slide 36 that is slidably mounted within a channel 38 in lower surface 16. Slide 36 is operatively connected to a slide plate 40 by means of a pin 42 slidably disposed within a cavity 43 in elongated member 12. Slide plate 40 is slidably mounted within a channel 44 disposed at the forward end of upper surface 14. In use slide plate 40 which projects above upper surface 14 is engaged and pushed by the thumb of the operator and its forward movement in channel 44 results in forward movement of label gripping surface 18 within channel 38.

FIGS. 2 and 3 illustrate the use and operation of device 10. In operation a corner 46 of a self-adhesive removable label assembly of the type having a label surface 48 and a support paper surface 50 is inserted into opening 32 between elongated member 12 and base member 20. Force is then exerted by the operator to close the opening 32 and securely grasp label assembly 46 between gripping surfaces 18 and 26. The corner is then bent at approximately a 90° angle and the operator utilizes his thumb to move slide plate 40 in a forward direction. The movement of slide plate 40 results in movement of label gripping surface 18 in a forward direction which causes label 48 to move forward relative to support paper 50. This causes the label to bunch up and present a surface 52 that may easily be grasped in order to peel label 48 from support paper 50.

Various modes of carrying out the invention are contemplated as being within the scope of the following claims particularly pointing out and distinctly claiming the subject matter which is regarded as the invention.

I claim:

1. A device for separating a self-adhesive removable label from its support paper, said device comprising:
   a first elongated member having a label gripping surface disposed at a first end, a second elongated member having a support paper gripping surface disposed at a first end said first and second members pivotally connected at a second end, and operating means for moving said label gripping surface relative to said support paper gripping surface along a line substantially parallel to said gripping surfaces while said gripping surfaces are in engagement with the label and the support paper so that the label is moved relative to the support paper and the process of removing the label from the support paper is initiated.

2. The device defined in claim 1 wherein said first elongated member includes an upper surface and a lower surface with said label gripping surface slidably disposed along said lower surface at a forward end of said elongated member so that said gripping surface may be slidably moved along a line substantially parallel to the longitudinal axis of said elongated member.

3. The device defined in claim 2 wherein said operating means comprises a slide plate mounted for movement in said upper surface of said first elongated member and operatively connected to said label gripping surface so that movement of said slide plate results in sliding movement of said label gripping surface.

4. The device defined in claim 3 wherein said slide plate is mounted for sliding movement along a line substantially parallel to the longitudinal axis of said first elongated member.

5. The device defined in claim 3 wherein said slide plate extends upwardly beyond said upper surface of said first elongated member.

6. The device defined in claim 1 wherein said second elongated member includes a base plate having a substantially planer bottom surface and an upper surface with said support paper gripping surface mounted at a forward end of said elongated base plate.

7. The device defined in claim 1 further comprising biasing means urging said device to an open position in which said first and second members are pivoted away from each other so as to create an opening between said members at said second end.

8. The device defined in claim 1, wherein said label gripping surface comprises a neoprene rubber pad.

9. The device defined in claim 1 wherein said support paper gripping surface comprise an èmery surface.

10. The device defined in claim 1 wherein said label gripping surface has a thickness greater than said support paper gripping surface.

11. A device for separating a self-adhesive removable label from its support paper, said device comprising:

an elongated member having an upper surface and a lower surface with a label gripping surface slidably disposed along said lower surface at a forward end of said elongated member so that said gripping surface may be slidably moved along a line substantially parallel to the longitudinal axis of said elongated member, an elongated base plate having a substantially planer bottom surface and an upper surface with a support paper gripping surface mounted at a forward end of said elongated base plate, said elongated member and said elongated base plate being pivotally attached at a rearward end, and a slide plate mounted for movement in said upper surface of said elongated member and operatively connected to said label gripping surface so that movement of said slide plate results in sliding movement of said label gripping surface along a line substantially parallel to said gripping surfaces while said gripping surfaces are in engagement with the label and the support paper so that the label is moved relative to the support surface and the process of removing the label from the support paper is initiated.

* * * * *